Figures 1, 2:
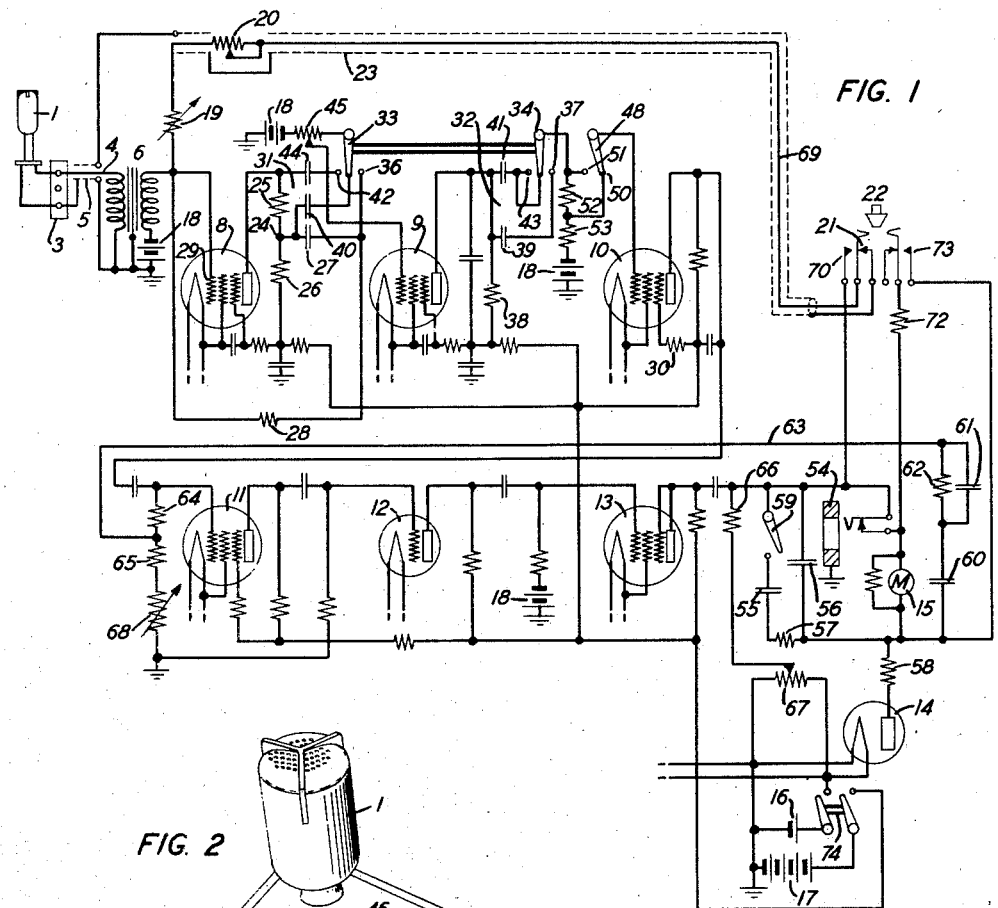

June 22, 1943. M. J. BURGER 2,322,708

VIBRATION MEASURING APPARATUS

Filed Jan. 31, 1942

INVENTOR
M. J. BURGER

BY
G. H. Heydt.
ATTORNEY

Patented June 22, 1943

2,322,708

UNITED STATES PATENT OFFICE 2,322,708

VIBRATION MEASURING APPARATUS

Michael J. Burger, South Ozone Park, N. Y., assignor to Western Electric Company, Incorporated, New York, N. Y., a corporation of New York Application January 31, 1942, Serial No. 429,068

8 Claims. (Cl. 179—1)

This invention relates to vibration measuring apparatus and the object of the invention is a compact, self-contained and readily portable unit of this type which is easily and accurately calibrated, simple to operate and stable in its performance under varied operating conditions.

According to the general features of the invention, the high gain amplifier required for such apparatus together with operating batteries therefor is mounted in a small light-weight carrying case having a cover which is removable to expose calibrating and operating controls, an indicating meter and jacks for a pick-up microphone or other source of current and a monitoring headset.

Negative feedback is provided in various parts of the circuit to establish both the gain of the amplifier and the operating characteristic of the rectifier used in connection with the output meter.

Another important feature of the invention is a positive feedback circuit for producing oscillations whereby the calibration of the instrument may be checked without the use of any external source of sound or electrical oscillations.

These and other features of the invention will be more clearly understood from the following detailed description and the accompanying drawing in which:

Fig. 1 is a circuit diagram of a sound level measuring apparatus according to the invention; and Fig. 2 is a perspective view of the apparatus mounted in a portable carrying case.

The sound pick-up microphone 1 is preferably of rugged construction with stable operating characteristics and a non-directional response such for example as that shown in Patent 2,131,593 to Marshall. When the apparatus is to be used this microphone is removed from its storage compartment (not shown) in the back of the case 2 and plugged into the jack 3 which is connected by conductor 4 and the shield 5 to the input transformer 6.

The secondary of this transformer is connected to the control grid 29 of the tube 8, the output of which passes through tubes 9, 10, 11, 12 and 13 in tandem to a diode rectifier 14 associated with the decibel meter 15. In order to simplify the drawing, the filament connections to the battery 16 have been omitted and separate grid biasing batteries 18 have been shown for several of the stages but in practice obviously only a single battery would be used as in the case of the plate battery 17. Since this apparatus is portable and should therefore be as small and light in weight as possible, the tubes 12, 13 and 14 are preferably sections of a single multi-element tube of a known type.

The variable resistor 20 and the resistor 19 are part of the calibrating circuit to be described and, to avoid undesirable pick-up by these resistors during normal operation, they are grounded through contact 21 on the key 22. The circuit of the pentode tube 8 associated with the transformer is conventional except that stabilizing feedback is obtained by a connection from the junction 24 between resistors 25 and 26 in the output circuit through a condenser 27 and a resistor 28 to the grid 29.

The connections of the pentodes 9 and 10 are conventional except that in the latter tube the unbypassed screen resistor 30 provides stabilizing feedback for this stage. The condenser 27 also forms a part of a weighting characteristic network for giving the conditions of low frequency response as required by the standards of the American Standards Association for sound level meters. According to this invention, however, greater accuracy in the weighting is obtained by providing two networks 31, 32 in the input and output circuits, respectively of the tube 9 and switching them by means of ganged switches 33, 34 operated simultaneously by the knob 35 (Fig. 2). When the switches are on contacts 36 and 37 the interstage couplings formed by the resistors 25, 26 and condenser 27 and the resistor 38 and condenser 39, respectively, are such that the over-all electroacoustic transmission characteristic is flat. In the position of the switches shown, the response is made to follow the so-called 70 decibels equal loudness contour by using condensers 40 and 41 of suitable capacities as coupling members and when the switches are on contacts 42 and 43, the response follows the 40 decibels equal loudness contour due to the connection of condenser 44 directly to the plate of tube 8.

The attenuating potentiometer 45 in the input of tube 9 is operated by the knob 46 with which there is associated a calibrated dial 47 for indicating the amount of attenuation in the circuit. The switch 48 in the input of the tube 10 is operated by the control knob 49 to switch the grid circuit of the tube between contacts 50 and 51. For normal operation, this switch is closed on contact 50 as shown but when measuring sounds of very low intensity it is moved to contact 51 where the potential across resistor 52 is added to that across resistor 53 to give a 20 decibel increase in gain.

The output of tube 10 is successively amplified in the tubes 11, 12 and 13 and a portion of the output of the latter tube is rectified by the tube 14 to energize the indicating meter 15. If desired, the noise being measured may be monitored by connecting a headset to the jack 54. Condensers 55, 56 and resistors 57 and 58 give the metering circuit the required timing characteristics and cause the meter indications to satisfy the rule of addition for apparatus of this time. These elements are of such value that with switch 59 open as shown, the meter has a ballistic characteristic like that of the human ear and therefore measures sounds of short duration as they are detected by the average person. When switch 59 is closed the connection of condenser 55 and resistor 57 across the meter reduces its speed of response and causes it to indicate the average level of rapidly fluctuating noises.

From the junction of the meter and resistor 58, a feedback connection is made through condensers 60, 61, resistor 62 and conductor 63 to the input circuit of the tube 11 at the junction of resistors 64 and 65. This provides a negative voltage feedback which is proportional to the product of the current through resistor 58 and the impedance of this resistor and the diode 14. For a fixed input this feedback therefore stabilizes the reading of the meter 15 over a wide range of diode plate characteristic variations.

Diodes, however, like other vacuum tubes, must be replaced occasionally and since a circuit of this kind cannot be made to function properly by merely replacing the diode with a new one of the same type, it has been customary heretofore in these meters to use copper-oxide rectifiers. While such rectifiers have a much longer life than diodes, they are inferior in other respects due to their temperature error and their shorter section of "square law" characteristic.

In this circuit the diode is suitably biased to a point on its characteristic where its current follows the square law as required for apparatus of this type by means of a potentiometer 67 connected across the filament battery and having its adjustable contact connected to the plate through a resistor 66 and the meter 15. The diode current corresponding to the bias necessary for square law operation of the particular type of diode used is noted and when it is necessary to replace it with a new one, which may have a different contact potential, the no-signal diode current is brought to the proper value by merely adjusting the potentiometer 67.

The initial calibration of the apparatus is made by picking up with the microphone and applying to the input circuit a signal of known intensity and, with suitable settings of the potentiometer 45 and the switch 48, varying the resistor 68 in the input of the tube 11 to vary the feedback voltage applied to this tube until a desired reading of the meter 15 is obtained. With the amplifier gain thus fixed at a suitable value, the calibrating key 22 is operated thereby disconnecting conductor 69 from ground and connecting it to the output of tube 13 at contact 70 to feed back energy to the input of tube 8 in a positive sense and cause the amplifier to oscillate. This feedback is adjusted by means of the resistor 20 to give a desired reading of the meter. In this operation a large variation in the value of resistor 20 may cause the gain of the amplifier to change slightly with the result that it may be advisable to repeat the procedure outlined above so as to obtain both the desired calibration reading and the proper gain value. The final meter reading is then noted and used thereafter as the calibration figure. The resistor 20 is then locked in its adjusted position.

Since the original gain of the amplifier will vary somewhat in use due to changes in battery potential, deterioration or replacing of tubes and other reasons, it is necessary to be able to check the calibration easily when measurements are to be made. The cover (not shown) is removed from the carrying case 2, the microphone is placed in its jack and switch 74 is closed to energize the tubes. The calibration is then checked by merely operating and holding the key 22 while adjusting the calibrating resistance 68 by means of the knob 71 (Fig. 2) until the oscillations cause the meter to indicate the correct calibrating figure originally determined by the apparatus. When this has been done the key 22 is released and the apparatus is ready for use.

When the gain is correct and the circuit constants are such that when the key 22 is operated the amplifier oscillates at a level giving a mid-scale deflection without the shunt connection of the resistor 72, the circuit is so sensitive to gain changes that a very small change such as .075 decibel is sufficient to prevent the circuit from oscillating or to drive the meter needle off scale.

Such a high degree of sensitivity is undesirable in many cases for if in checking the gain the circuit does not oscillate or gives an off-scale indication, the operator has no quantitative check on the percentage of error in the readings taken since the last check on the gain was made. By connecting resistor 72 in shunt with the meter during the gain checking operation, the meter will give an on-scale reading over a greater range of gain variations.

It will be clear from the above explanation that the value of this resistor is chosen to give a practical compromise between great accuracy in measurement of the gain and the probable change in gain between successive checkings of the calibration. Due primarily to the large amount of negative feedback used, this circuit is very stable and it is found that a resistor 72 of such value that the meter reads on-scale for gains ranging from plus .75 decibel to minus .75 decibel from the correct value is suitable for general use.

If a very accurate check is desired, this resistor may, of course, be entirely omitted or a switch (not shown) may be provided for disconnecting the resistor 72 after the calibrating adjustment has been made so that the gain may be checked again with the meter operating at high sensitivity. If such a switch is used, it will also be necessary to increase the resistance in the feedback path by adjusting resistor 19, for example, to compensate for the change in the impedance of the load.

While the invention has been described for purposes of illustration with reference to a particular sound level meter circuit, it will be understood that the microphone shown may be replaced with any other source of currents representing vibrations of any other kind to be measured and that the utility of various features of the invention is not limited to sound level meters.

What is claimed is:

1. Portable, self-contained, measuring apparatus comprising a carrying case containing input connections, a meter, a multistage amplifier having an input circuit connected to the input connection, and an output circuit connected to the meter, batteries for energizing the amplifier, negative feedback circuits in the amplifier for stabilizing the gain of the amplifier, and means for producing within the amplifier and impressing on the meter oscillations of an amplitude varying with the gain of the amplifier for checking the gain of the apparatus.

2. Measuring apparatus comprising a meter, an amplifier having an input circuit for connection to a source of currents to be measured and an output circuit connected to the meter, means for adjusting the gain of the amplifier, and means for checking the gain of the amplifier comprising a variable impedance and a switch for connecting the impedance from the output circuit to the input circuit to produce in the output circuit oscillations of an amplitude bearing a predetermined relationship to the gain of the amplifier.

3. Measuring apparatus according to claim 2 in which the operation of the switch to produce oscillations modifies the sensitivity of the meter to changes of gain of the amplifier.

4. Measuring apparatus according to claim 2 in which the operation of the switch to produce oscillations connects a resistor across the output circuit to increase the range of gain indicated by the meter.

5. In a sound level measuring apparatus the combination with a pick-up microphone, a meter and a multistage amplifier having an input circuit connected to the microphone and an output circuit connected to the meter of adjustable coupling networks between certain of the stages of the amplifier and means for simultaneously adjusting the networks for weighting the response characteristic of the amplifier to simulate the response characteristic of the human ear for sounds of the different intensities.

6. In a sound level measuring apparatus the combination with a pick-up microphone, a meter and a multistage amplifier having an input circuit connected to the microphone and an output circuit connected to the meter, of a diode connected in series with the meter in the output circuit and means for feeding back to the input circuit of one of the amplifier stages in a negative sense, a voltage proportional to the current through the diode to stabilize the operation of the diode.

7. In a sound level measuring apparatus the combination with a pick-up microphone, a meter and a multistage amplifier having an input circuit connected to the microphone and an output circuit connected to the meter, of a switch, a resistor having one terminal connected to the input circuit and another terminal normally connected to ground through the switch and contacts on the switch for switching said other terminal from ground to the output circuit for producing oscillations for checking the gain of the amplifier.

8. In a sound level measuring apparatus the combination with a pick-up microphone, a meter and multistage amplifier having an input circuit connected to the microphone and an output circuit connected to the meter, of a diode rectifier connected in series with the meter and having a current characteristic which over a considerable predetermined range varies substantially as the square of the potential difference of the electrodes of the diode, means for energizing the diode and means for variably biasing the diode to adjust the diode current to a value within said range when no sounds are being received by the microphone.

MICHAEL J. BURGER.